United States Patent
Udaka et al.

(10) Patent No.: US 9,799,320 B2
(45) Date of Patent: Oct. 24, 2017

(54) MOBILE TERMINAL APPARATUS AND NON-TRANSITORY COMPUTER READABLE MEDIUM

(71) Applicant: FUJI XEROX CO., LTD., Tokyo (JP)

(72) Inventors: Tsutomu Udaka, Kanagawa (JP); Atsushi Kitagawara, Kanagawa (JP); Fumihiko Ogasawara, Kanagawa (JP); Tomoyuki Mitsuhashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/013,447

(22) Filed: Feb. 2, 2016

(65) Prior Publication Data

US 2017/0092257 A1    Mar. 30, 2017

(30) Foreign Application Priority Data

Sep. 24, 2015  (JP) .................................. 2015-187230

(51) Int. Cl.
- H04R 29/00  (2006.01)
- G10K 11/26  (2006.01)
- G01H 3/04   (2006.01)

(52) U.S. Cl.
CPC ............... *G10K 11/26* (2013.01); *G01H 3/04* (2013.01); *G10K 2210/3025* (2013.01); *G10K 2210/30231* (2013.01)

(58) Field of Classification Search
CPC ......... G10K 11/26; G10K 2210/30231; G10K 2210/3025
See application file for complete search history.

(56) References Cited

U.S. PATENT DOCUMENTS 7,187,773 B2 * 3/2007 Hamada ................. G01N 29/14
                                                          381/56
8,588,630 B2   11/2013 Kurimoto et al.
(Continued)

FOREIGN PATENT DOCUMENTS

JP    07-261834    10/1995
JP    10-258974     9/1998
(Continued)

OTHER PUBLICATIONS

Communication dated Feb. 2, 2016, issued by the Japan Patent Office in corresponding Japanese Application No. 2015-187230.
(Continued)

*Primary Examiner* — Regina N. Holder
(74) *Attorney, Agent, or Firm* — Sughrue Mion, PLLC

(57) ABSTRACT

A mobile terminal apparatus portable by a user includes a recording unit, a memory, an estimating unit, and an output unit. The recording unit records a sound that has been produced by another apparatus. The memory stores a cause of an unusual noise that occurs in the other apparatus and intensities of individual frequency components of the unusual noise in association with each other. The estimating unit estimates a cause of the sound that has been produced by the other apparatus, on the basis of intensities of individual frequency components of the sound recorded by the recording unit and content stored in the memory, the intensities being calculated from the sound. The output unit outputs information about the cause of the sound estimated by the estimating unit.

12 Claims, 7 Drawing Sheets

(56) References Cited

U.S. PATENT DOCUMENTS

2012/0323531 A1\* 12/2012 Pascu .................. G01M 13/028
                                                  702/184
2013/0304476 A1\* 11/2013 Kim ........................ H04N 7/15
                                                  704/270

FOREIGN PATENT DOCUMENTS

| | | |
|---|---|---|
| JP | 2001-324380 | 11/2001 |
| JP | 2006208074 A | 8/2006 |
| JP | 2008-092358 | 4/2008 |
| JP | 2008-216822 A | 9/2008 |
| JP | 2008-304872 A | 12/2008 |
| JP | 2009-205121 A | 9/2009 |
| JP | 2012002759 A | 1/2012 |
| JP | 2012098149 A | 5/2012 |
| JP | 2012-145806 A | 8/2012 |
| JP | 2013223243 A | 10/2013 |
| JP | 2015108887 A | 6/2015 |
| WO | 0244671 A1 | 6/2002 |

OTHER PUBLICATIONS

Communication dated Jun. 21, 2016, from the Japanese Patent Office in counterpart Japanese application No. 2015-187230.

Communication dated Nov. 8, 2016, from the Japanese Patent Office in counterpart application No. 2015-187230.

\* cited by examiner

FIG. 4
| MODEL ID | | | |
|---|---|---|---|
| M0 | FREQUENCY DATA | CAUSE | COPING METHOD |
| M1 | FREQUENCY DATA | CAUSE | COPING METHOD |
| M2 | FREQUENCY DATA | CAUSE | COPING METHOD |
| M3 | FREQUENCY DATA | CAUSE | COPING METHOD |
| M4 | ............... | ......... | ......... |
| M5 | ............... | ......... | ......... |
| M6 | ............... | ......... | ......... |
| ⋮ | ............... | ......... | ......... |
| | ............... | ......... | ......... |
| | ⋮ | ⋮ | ⋮ |
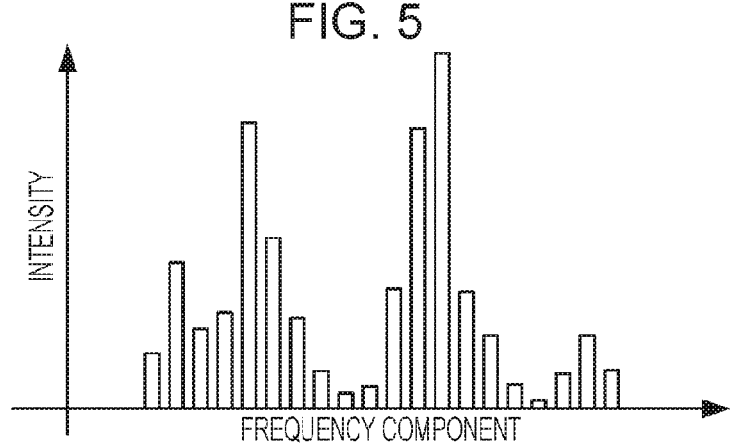
FIG. 5
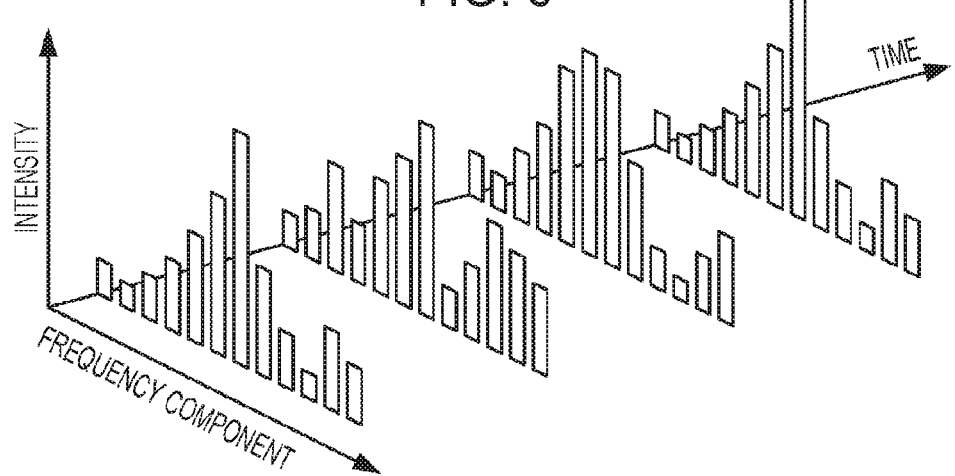
FIG. 6

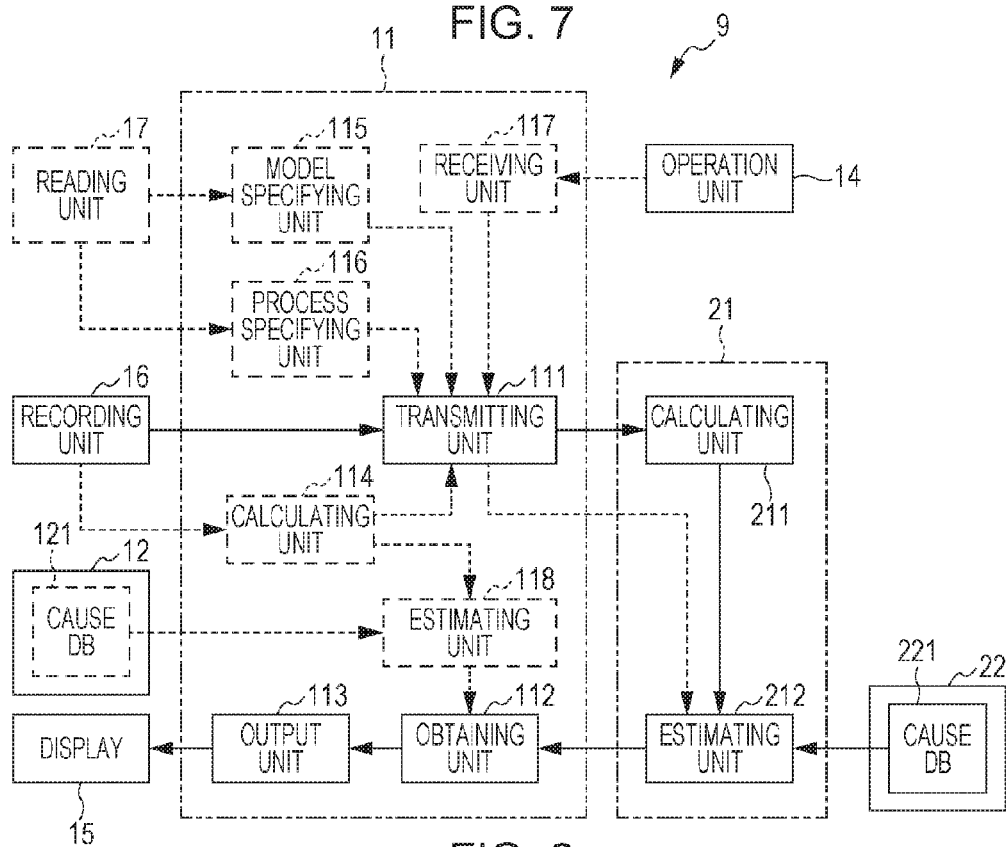
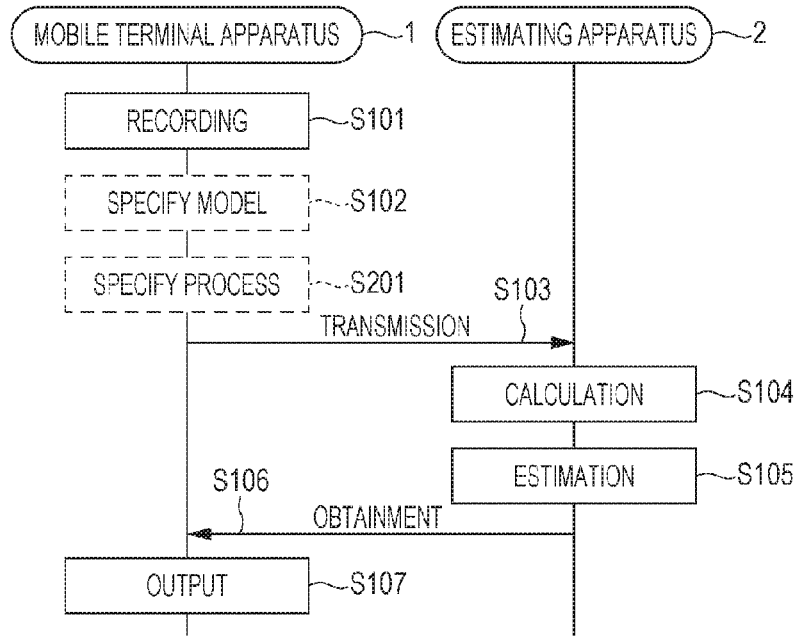

MOBILE TERMINAL APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-187230 filed Sep. 24, 2015.

BACKGROUND (i) Technical Field

The present invention relates to a mobile terminal apparatus and a non-transitory computer readable medium.

(ii) Related Art

A system for recording an unusual noise that occurs in an image forming apparatus or the like and estimating the cause thereof has been developed.

SUMMARY

According to an aspect of the invention, there is provided a mobile terminal apparatus portable by a user. The mobile terminal apparatus includes a recording unit, a memory, an estimating unit, and an output unit. The recording unit records a sound that has been produced by another apparatus. The memory stores a cause of an unusual noise that occurs in the other apparatus and intensities of individual frequency components of the unusual noise in association with each other. The estimating unit estimates a cause of the sound that has been produced by the other apparatus, on the basis of intensities of individual frequency components of the sound recorded by the recording unit and content stored in the memory, the intensities being calculated from the sound. The output unit outputs information about the cause of the sound estimated by the estimating unit.

BRIEF DESCRIPTION OF THE DRAWINGS

An exemplary embodiment of the present invention will be described in detail based on the following figures, wherein:

FIG. 4 is a diagram illustrating an example of a cause DB;

FIG. 5 is a diagram illustrating intensities of individual frequency components of a sound;

FIG. 6 is a diagram illustrating temporal changes in intensities of individual frequency components of a sound;

FIG. 7 is a diagram illustrating the functional configuration of the information output system;

FIG. 8 is a sequence diagram illustrating a flow of operation of the information output system;

DETAILED DESCRIPTION

1. Exemplary Embodiment

1-1. Configuration of Information Output System

Figure 1:
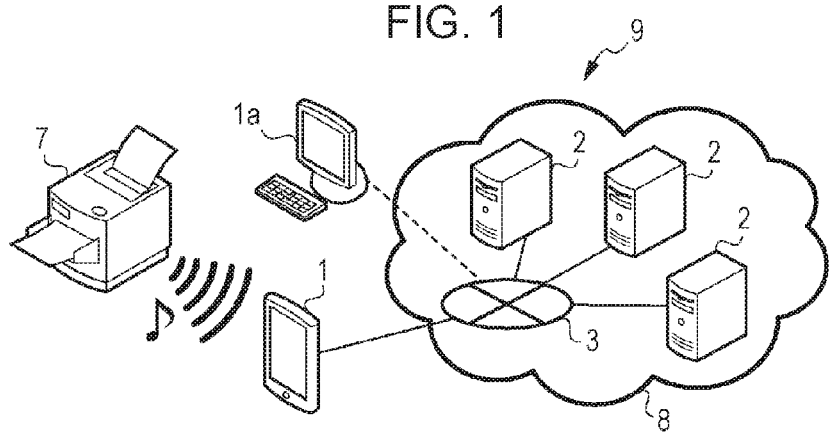
FIG. 1 is a schematic diagram illustrating the configuration of an information output system according to the exemplary embodiment of the present invention.

FIG. 1 is a schematic diagram illustrating the configuration of an information output system 9 according to an exemplary embodiment of the present invention. The information output system 9 illustrated in FIG. 1 is a system for estimating a cause of an unusual noise included in a sound produced by an image forming apparatus 7, and includes a mobile terminal apparatus 1 and a cloud system 8. The cloud system 8 includes a communication network 3 and one or more estimating apparatuses 2, and provides the mobile terminal apparatus 1 with a cloud service, which is information processing for estimating a cause of an unusual noise executed by any one of the estimating apparatuses 2. The communication network 3 is a network that relays communication performed between the mobile terminal apparatus 1 and the estimating apparatuses 2, and is, for example, the Internet.

The mobile terminal apparatus 1 is a terminal apparatus that records a sound produced by the image forming apparatus 7 and outputs information about a cause of an unusual noise included in the sound. The mobile terminal apparatus 1 transmits information to and receives information from the cloud system 8. The image forming apparatus 7 is an apparatus that forms an image on a medium, such as a sheet, and is an example of "another apparatus" different from the mobile terminal apparatus 1 and the estimating apparatuses 2. Note that "another apparatus" according to the exemplary embodiment is not limited to an apparatus that forms an image on a medium, and may be an apparatus that implements another function.

1-2. Configuration of Mobile Terminal Apparatus

Figure 2:
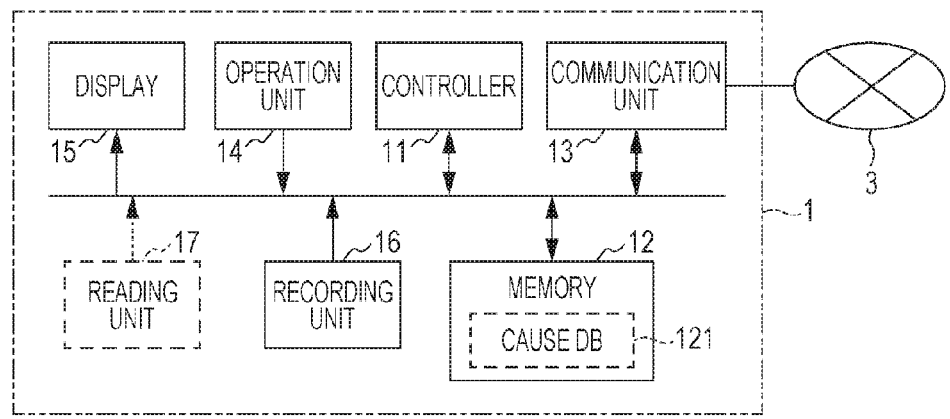
FIG. 2 is a diagram illustrating the configuration of a mobile terminal apparatus.

FIG. 2 is a diagram illustrating the configuration of the mobile terminal apparatus 1. The mobile terminal apparatus 1 includes a controller 11, a memory 12, a communication unit 13, an operation unit 14, a display 15, and a recording unit 16. In the exemplary embodiment, the mobile terminal apparatus 1 further includes a reading unit 17.

The controller 11 includes an arithmetic device such as a central processing unit (CPU), and main memories such as a read only memory (ROM) and a random access memory (RAM). The arithmetic device executes a program stored in the ROM or the memory 12 by using the RAM as a working area, and thereby controls the operations of the individual units of the mobile terminal apparatus 1.

The communication unit 13 is an interface that is used for communicating with the estimating apparatuses 2 via the communication network 3.

The operation unit 14 includes a touch panel that detects a position touched by an indicator, such as a finger of a user, and specifies an instruction provided from the user, and also includes an operator, such as an operation button that is used by the user to provide various instructions. The operation unit 14 receives an operation performed by the user and supplies a signal corresponding to the operation to the controller 11.

The display 15 includes a liquid crystal display (LCD) and displays various pieces of information indicated by the controller 11. The above-described touch panel of the operation unit 14 may be superimposed on the display 15. In this case, the touch panel is formed of a transparent material so that an image displayed on the LCD of the display 15 is viewable from the user.

The memory 12 is a storage device, such as a solid state drive, and stores data and programs used by the controller 11.

The recording unit 16 is a microphone or the like for recording sounds. In a case where the recording unit 16 is located in a range over which a sound produced by the image forming apparatus 7 propagates and the controller 11 instructs the recording unit 16 to record the sound, the recording unit 16 records the sound, generates a sound signal corresponding to the sound, and supplies the sound signal to the controller 11.

The reading unit 17 is a scanner that optically reads a one-dimensional or two-dimensional bar code, and specifies information indicated by the read bar code. The reading unit 17 may include an imaging device that captures an image of a character string and perform character recognition by using the captured image, so as to specify information indicated by the character string. The reading unit 17 may capture an image of a character string or a bar code that is displayed on an LCD or the like controlled by a control device of the image forming apparatus 7.

The reading unit 17 is not limited to a device that performs optical reading, and may be, for example, a magnetic card reader that reads information stored in a magnetic card or an integrated circuit (IC) card reader that reads information stored in an IC card. Alternatively, the reading unit 17 may be a receiver that receives a radio identification signal generated by a beacon compatible with the IEEE 802.15 standard.

1-3. Configuration of Estimating Apparatus

Figure 3:
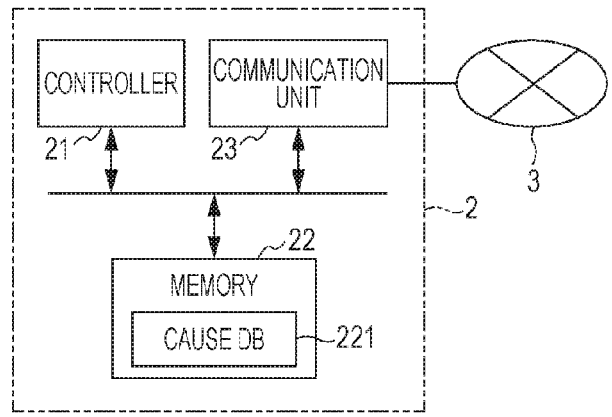
FIG. 3 is a diagram illustrating the configuration of an estimating apparatus.

FIG. 3 is a diagram illustrating the configuration of each of the estimating apparatuses 2. The estimating apparatus 2 includes a controller 21, a memory 22, and a communication unit 23. The controller 21 includes an arithmetic device such as a CPU and main memories such as a ROM and a RAM. The arithmetic device executes a program stored in the ROM or the memory 22 by using the RAM as a working area, and thereby controls the operations of the individual units of the estimating apparatus 2. The communication unit 23 is an interface that is used for communicating with the mobile terminal apparatus 1 via the communication network 3.

The memory 22 is a storage device, such as a hard disk drive, and stores data and programs used by the controller 21. The memory 22 also stores a cause database (DB) 221.

FIG. 4 is a diagram illustrating an example of the cause DB 221. The cause DB 221 is a database in which a cause of an unusual noise that occurs in the image forming apparatus 7 and intensities of individual frequency components of the unusual noise are associated with each other, and includes a model ID list 2211 and plural cause tables 2212. The model ID list 2211 is a list describing model IDs that identify the models of the image forming apparatus 7. Each of the model IDs "M0", "M1", "M2", and so forth described in the model ID list 2211 is associated with a corresponding one of the cause tables 2212.

In each cause table 2212, "frequency data", "cause", and "coping method" are stored in association with one another. "Frequency data" is data representing a feature of a sound, and is data representing intensities of individual frequency components of the sound. "Cause" is information representing a reason why the sound having the feature represented by the "frequency data" is produced. "Coping method" is information representing a measure against the "cause" and is a method for preventing production of the sound. Examples of "cause" include a malfunction of a driving motor of a roller that transports a sheet, a bad contact between a transfer belt and a cleaning blade, and foreign matter mixing in a tonner supply device. Examples of "coping method" include replacement of a motor, adjustment of a contact angle of the cleaning blade, and cleaning of a tonner container.

FIG. 5 is a diagram illustrating intensities of individual frequency components of a sound. In FIG. 5, the horizontal axis represents frequency components and the vertical axis represents intensities of the individual frequency components. The frequency data stored in each cause table 2212 includes the intensities of the individual frequency components of a sound illustrated in FIG. 5. The frequency data is generated by an analyzing apparatus by, for example, artificially generating a corresponding "cause" in the image forming apparatus 7 identified by the corresponding "model ID", and sampling an unusual noise that has occurred.

The unusual noise produced by artificially generating the above-described "cause" is recorded by a microphone and is converted to a sound signal. The sound signal obtained through the conversion is transmitted to the analyzing apparatus and is transformed, by using fast Fourier transform (FFT) or the like, into a frequency spectrum representing the intensities (or amplitudes) of individual frequency components of the sound. The frequency spectrum obtained through FFT is stored in the cause table 2212 as data forming the frequency data. The frequency spectrum is a transformed sound signal from the start to the end of a sampling period, and exhibits steady characteristics of the sound represented by the sound signal.

The frequency data may include a frequency spectrum obtained by transforming a sound signal over a sampling period, and may include data indicating temporal changes in the frequency spectrum. FIG. 6 is a diagram illustrating temporal changes in intensities of individual frequency components of a sound.

For example, a sound signal representing an unusual noise produced by artificially generating the above-described "cause" undergoes short-time Fourier transform (STFT) performed by the analyzing apparatus and is transformed into frequency spectra for individual short time periods. The frequency spectra for the individual short time periods generated through STFT are stored in the cause table 2212 as data forming the frequency data. As illustrated in FIG. 6, the frequency spectra for the individual short time periods included in the frequency data represent temporal changes in the intensities of the individual frequency components of a sound.

The frequency spectrum represents the characteristics of an unusual noise that continuously occurs. Temporal changes in the frequency spectrum represent the characteristic of an unusual noise that periodically occurs.

1-4. Functional Configuration of Information Output System

FIG. 7 is a diagram illustrating the functional configuration of the information output system 9. The controller 11 of the mobile terminal apparatus 1 reads and executes a program stored in the memory 12 and thereby functions as a transmitting unit 111, an obtaining unit 112, and an output unit 113. In the exemplary embodiment, the controller 11 also functions as a model specifying unit 115.

The controller 21 of the estimating apparatus 2 reads and executes a program stored in the memory 22 and thereby functions as a calculating unit 211 and an estimating unit 212.

The recording unit 16 records a sound produced by the image forming apparatus 7 (another apparatus) and supplies a sound signal representing the sound to the controller 11.

The model specifying unit 115 specifies the model of the image forming apparatus 7 that has produced the sound recorded by the recording unit 16. A bar code or the like representing the model ID identifying the model of the image forming apparatus 7 is printed on a side surface or the like of the image forming apparatus 7. The user of the mobile terminal apparatus 1 causes the reading unit 17 of the mobile terminal apparatus 1 to face toward the bar code or the like printed on the side surface of the image forming apparatus 7 and to read the bar code. The model specifying unit 115 specifies the model of the image forming apparatus 7 on the basis of the model ID represented by the bar code read by the reading unit 17.

The transmitting unit 111 transmits the sound signal representing the sound recorded by the recording unit 16 (sound data about a sound) and the model ID of the image forming apparatus 7 that has produced the sound to the estimating apparatus 2.

The calculating unit 211 calculates the intensities of individual frequency components of the sound on the basis of the sound signal received from the mobile terminal apparatus 1.

The cause DB 221 of the memory 22 stores, for each model of the image forming apparatus 7, a cause of an unusual noise that occurs in the image forming apparatus 7 and frequency data representing the characteristics of the unusual noise that occurs due to the cause (sound data about an unusual noise) in association with each other.

The estimating unit 212 estimates a cause of an unusual noise included in the sound produced in the image forming apparatus 7, on the basis of the model ID received from the mobile terminal apparatus 1, the calculated intensities of the individual frequency components of the sound, and the content stored in the cause DB 221 of the memory 22.

Specifically, the estimating unit 212 searches the model ID list 2211 in the cause DB 221 for the model ID received from the mobile terminal apparatus 1 and specifies the cause table 2212 associated with the model ID. Subsequently, the estimating unit 212 compares the intensities of the individual frequency components of the sound calculated by the calculating unit 211 with the frequency data stored in the cause table 2212 so as to calculate a degree of similarity therebetween, and specifies frequency data including a frequency spectrum having the intensities that are the most similar to the calculated intensities of the individual frequency components.

The degree of similarity may be calculated by taking the square of the differences in the intensities of individual frequency components of both to be compared or by taking the absolute values of the differences, and by summing up the results. Alternatively, a harmonic component may be extracted from the frequency spectrum of the sound calculated by the calculating unit 211, and the harmonic component may be compared with the frequency data stored in the cause table 2212. Note that, for example, a harmonic component represented by N/M times (N and M are positive integers) may deviate from N/M times, and thus the intensity of sound in a predetermined range including N/M times may be compared with the above-described frequency data.

The estimating unit 212 estimates that the cause associated with the frequency data is the cause of the unusual noise included in the sound recorded by the mobile terminal apparatus 1, and transmits information representing the estimated cause and a coping method for the cause to the mobile terminal apparatus 1.

The obtaining unit 112 obtains the information representing the cause of the sound produced in the image forming apparatus 7, which has been estimated by the estimating apparatus 2, and the coping method for the cause (information about a cause).

The output unit 113 outputs the information obtained by the obtaining unit 112 to the display 15. The display 15 displays the information output by the output unit 113.

1-5. Operation of Information Output System

FIG. 8 is a sequence diagram illustrating a flow of operation of the information output system 9. In the information output system 9, the mobile terminal apparatus 1 records, with the recording unit 16, a sound produced by the image forming apparatus 7 (step S101), and specifies the model of the image forming apparatus 7 that has produced the recorded sound (step S102). Subsequently, the mobile terminal apparatus 1 transmits a model ID representing the specified model and a sound signal representing the recorded sound to the estimating apparatus 2 (step S103).

Upon receiving the model ID and the sound signal from the mobile terminal apparatus 1, the estimating apparatus 2 calculates, from the sound signal, intensities of individual frequency components of the sound recorded by the mobile terminal apparatus 1 (step S104). Subsequently, the estimating apparatus 2 estimates a cause of the sound recorded by the mobile terminal apparatus 1 on the basis of the model ID, the calculated intensities of the individual frequency components, and the content stored in the cause DB 221 in the memory 22 (step S105).

The mobile terminal apparatus 1 obtains information about the cause of the sound produced by the image forming apparatus 7 that has been estimated by the estimating apparatus 2 (step S106), and outputs the obtained information to the display 15 (step S107). Accordingly, the display 15 displays the output information.

With this configuration, the information output system 9 estimates a cause of a sound produced in an apparatus, such as the image forming apparatus 7, which does not include therein a recording unit such as a microphone.

For example, in a case where a microphone is mounted in an apparatus, an unusual noise that has occurred may be recorded by the microphone and a maintenance worker may analyze the noise later. However, in the case where a microphone is mounted in an apparatus, there is a risk that a recorded sound may be secretly listened to by an unintended person. Thus, in many cases, it is undesirable that a device for recording a sound be mounted in the apparatus.

In the information output system 9 according to the exemplary embodiment of the present invention, a device for recording a sound is not mounted in another apparatus, such as the image forming apparatus 7, and the recording unit 16 included in the mobile terminal apparatus 1 records a sound. Thus, a sound is recorded only when the user of the image forming apparatus 7 gives permission to a maintenance worker (the user of the information output system 9).

In the information output system 9 according to the exemplary embodiment of the present invention, a cause of an unusual noise and intensities of individual frequency components of the unusual noise are stored in association with each other for each model of another apparatus, and the model of the other apparatus is specified in the case of estimating a cause of a sound produced in the other apparatus.

2. Modification Examples

The exemplary embodiment has been described above. The exemplary embodiment may be modified in the following manner. Further, any combination of the following modification examples may be accepted.

2-1. First Modification Example

In the estimating apparatus 2, the cause DB 221 stored in the memory 22 may store a cause for each process that is being executed when an unusual noise occurs in another apparatus, instead of each model of another apparatus that has produced an unusual noise. In this case, the controller 11 of the mobile terminal apparatus 1 may function as a process specifying unit 116 that specifies a process that is being executed by the image forming apparatus 7 when a sound recorded by the recording unit 16 is produced. For example, the reading unit 17 reads a bar code, a character string, an identification signal of a beacon, or the like that changes in accordance with a process executed by the image forming apparatus 7, under control performed by a control device of the image forming apparatus 7. The process specifying unit 116 may specify the foregoing process on the basis of the information read by the reading unit 17.

Figure 9:
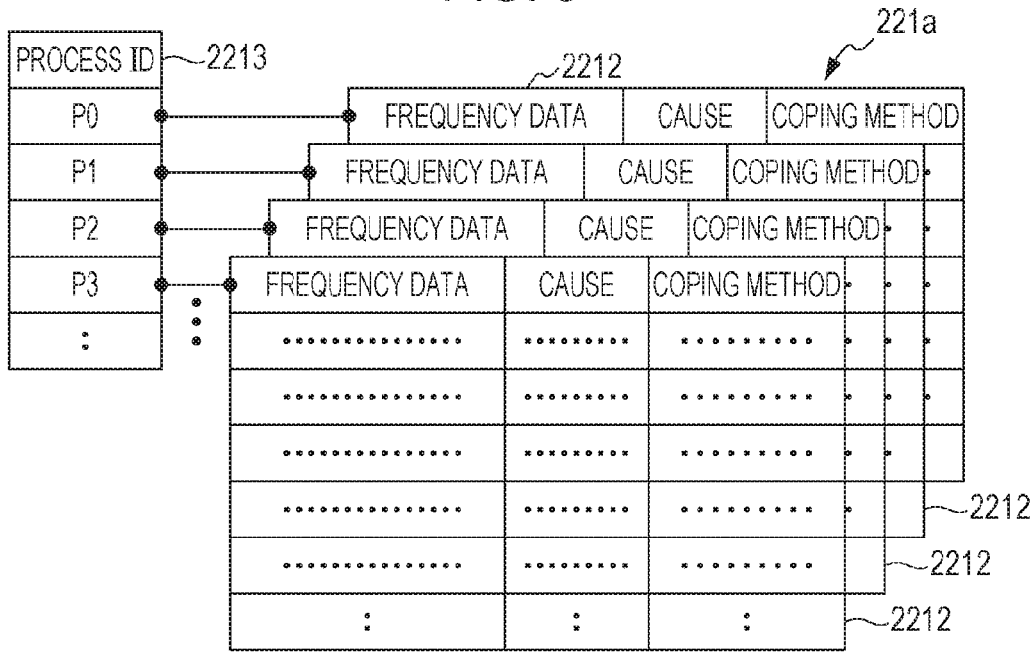
FIG. 9 is a diagram illustrating an example of a cause DB according to a first modification example.

FIG. 9 is a diagram illustrating an example of a cause DB 221a according to a first modification example. The cause DB 221a includes a process ID list 2213, instead of the model ID list 2211.

The process ID list 2213 is a list describing process IDs for identifying processes executed by the image forming apparatus 7. A process executed by the image forming apparatus 7 varies in accordance with the type of medium such as a sheet on which an image is formed, the type of developer used for forming an image, the presence/absence of an instruction to save the developer, whether an image is formed on one side or two sides of a medium, and whether or not a process of combining plural pages into one page is performed, and so forth, and accordingly the transport speed of a medium, the rotation speed of a transfer belt, and the number of operating toner supply devices vary. Therefore, the characteristic of an unusual noise that may occur may vary among processes.

Further, the type of process may vary in accordance with, in addition to those described above, the type of function to be used, for example, copy, scan, or print; the basis weight, size, or transport direction of a medium; the type of container accommodating the medium to be used; the presence/absence of optional equipment such as a stapler; whether or not an automatic document feeder is to be used; the temperature and humidity inside the image forming apparatus 7; the transport destination of a medium on which an image has been formed; and so forth.

Each of the process IDs "P0", "P1", "P2", and so forth described in the process ID list 2213 is associated with a corresponding one of the cause tables 2212. Each of the cause tables 2212 describes frequency data of an unusual noise that occurs when the image forming apparatus 7 is executing the process identified by the corresponding process ID, a cause of the unusual noise, and a coping method for the cause.

The mobile terminal apparatus 1 specifies a process that the image forming apparatus 7 is executing when the sound recorded in step S101 by the recording unit 16 is produced (step S201 indicated by a broken line in FIG. 8). Subsequently, the mobile terminal apparatus 1 transmits a process ID identifying the specified process and a sound signal representing the recorded sound to the estimating apparatus 2 (step S103).

Upon receiving the process ID and the sound signal from the mobile terminal apparatus 1, the estimating apparatus 2 calculates, from the sound signal, intensities of individual frequency components of the sound recorded by the mobile terminal apparatus 1 (step S104), and estimates a cause of the sound recorded by the mobile terminal apparatus 1 on the basis of the process ID, the calculated intensities of the individual frequency components, and the content stored in the cause DB 221 in the memory 22 (step S105).

With this operation, the information output system 9 estimates the cause of the sound by narrowing down the types of process executed by the image forming apparatus 7.

2-2. Second Modification Example

In the estimating apparatus 2, the cause DB 221 stored in the memory 22 may store a cause for each combination of a model of another apparatus that has produced an unusual noise and a process that is being executed when the unusual noise is produced in the other apparatus.

Figure 10:
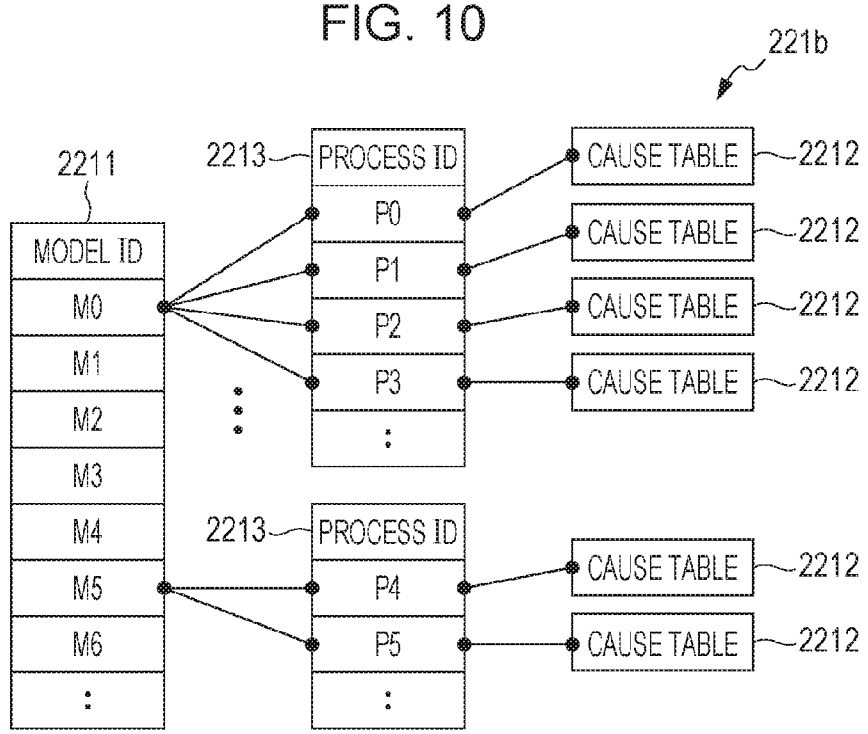
FIG. 10 is a diagram illustrating an example of a cause DB according to a second modification example.

FIG. 10 is a diagram illustrating an example of a cause DB 221b according to a second modification example. The cause DB 221b includes a model ID list 2211 and process ID lists 2213. Each of the model IDs described in the model ID list 2211 is associated with a process ID list 2213 describing the process IDs representing the types of processes executed by the image forming apparatus 7 identified by the model ID. In the cause DB 221b, each combination of a model ID and a process ID is associated with a cause table 2212. The cause table 2212 describes frequency data of an unusual noise that occurs when the image forming apparatus 7 identified by the corresponding model ID executes the process identified by the corresponding process ID, a cause of the unusual noise, and a coping method for the cause.

In this case, the mobile terminal apparatus 1 transmits a model ID, a process ID, and a sound signal to the estimating apparatus 2. Upon receiving the model ID, the process ID, and the sound signal from the mobile terminal apparatus 1, the estimating apparatus 2 calculates, from the sound signal, intensities of individual frequency components of the sound recorded by the mobile terminal apparatus 1 (step S104 in FIG. 8), and estimates a cause of the sound recorded by the mobile terminal apparatus 1 on the basis of the model ID, the process ID, the calculated intensities of the individual frequency components, and the content stored in the cause DB 221 in the memory 22.

With this operation, the information output system 9 estimates the cause of the sound by narrowing down the models of the image forming apparatus 7 and the types of process executed by the image forming apparatus 7.

The mobile terminal apparatus 1 does not necessarily include the reading unit 17. In this case, the mobile terminal apparatus 1 may receive, with the operation unit 14, a user operation for designating a model and a process, and may specify a model ID and a process ID. In a case where the mobile terminal apparatus 1 does not include the reading unit 17, the mobile terminal apparatus 1 does not have to specify a model ID and a process ID. In this case, the cause DB 221 may store one cause table.

2-3. Third Modification Example

In the above-described exemplary embodiment, intensities of individual frequency components of a recorded sound are calculated from the sound by the estimating apparatus 2, but the intensities of the individual frequency components of the sound may be calculated by the mobile terminal apparatus 1. In this case, the controller 11 of the mobile terminal apparatus 1 may function as a calculating unit 114 indicated by a broken line in FIG. 7. The calculating unit 114 performs fast Fourier transform or the like on a sound signal representing the sound recorded by the recording unit 16 and calculates a frequency spectrum representing the intensities of individual frequency components of the sound.

The transmitting unit 111 may transmit the frequency spectrum calculated by the calculating unit 114 to the estimating apparatus 2. In this case, the estimating apparatus 2 does not necessarily have the calculating unit 211, and the estimating unit 212 may estimate a cause of an unusual noise included in the recorded sound on the basis of the frequency spectrum transmitted from the mobile terminal apparatus 1 and the content stored in the cause DB 221.

Figure 11:
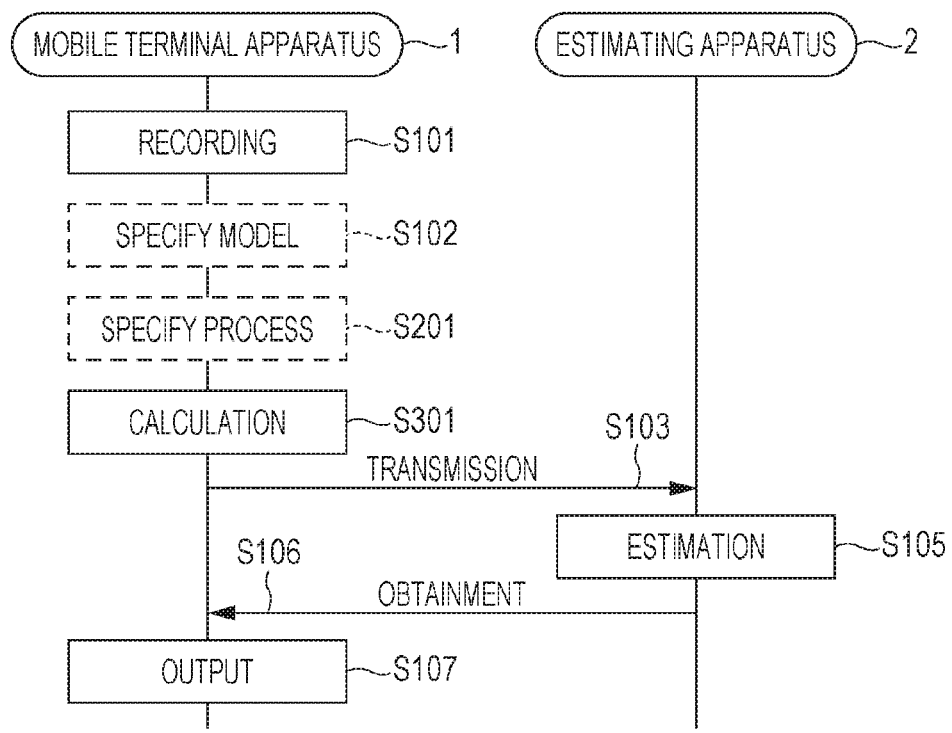
FIG. 11 is a sequence diagram illustrating a flow of operation of the information output system according to a third modification example.

FIG. 11 is a sequence diagram illustrating a flow of operation of the information output system 9 according to a third modification example. Before transmitting data to the estimating apparatus 2 in step S103, the mobile terminal apparatus 1 calculates a frequency spectrum of the recorded sound (step S301). Subsequently, the mobile terminal apparatus 1 transmits the calculated frequency spectrum, instead of the sound signal representing the recorded sound, to the estimating apparatus 2 (step S103). In this case, the estimating apparatus 2 may estimate a cause of the sound recorded by the mobile terminal apparatus 1 on the basis of the frequency spectrum (the intensities of individual frequency components) transmitted from the mobile terminal apparatus 1 and the content stored in the cause DB 221 in the memory 22 (step S105).

With this configuration, the amount of data to be transmitted to the estimating apparatus 2 may be smaller and the band load of a communication network may be lower than in a case where the calculating unit 114 is not provided. Further, the load of arithmetic operation performed by the estimating apparatus 2 may be smaller than in a case where the calculating unit 211 is provided.

2-4. Fourth Modification Example

The mobile terminal apparatus 1 may estimate a cause of a recorded sound on the basis of the intensities of individual frequency components calculated from the recorded sound. That is, the controller 11 of the mobile terminal apparatus 1 may function as an estimating unit 118 (indicated by a broken line in FIG. 7) that estimates a cause of a sound produced in the image forming apparatus 7 on the basis of the intensities of the individual frequency components of the sound calculated from the sound recorded by the recording unit 16 and the content stored in the memory 12.

Figure 12:
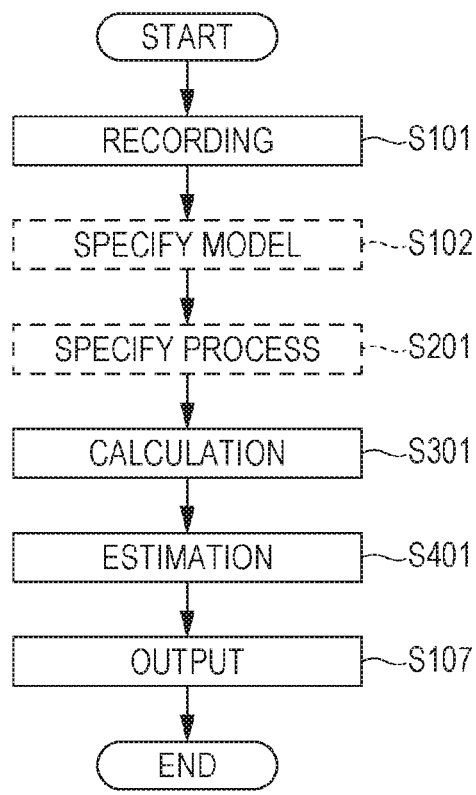
FIG. 12 is a flowchart illustrating a flow of operation of the mobile terminal apparatus according to a fourth modification example.

FIG. 12 is a flowchart illustrating a flow of operation of the mobile terminal apparatus 1 according to a fourth modification example. In this case, the mobile terminal apparatus 1 may store, in the memory 12, a database (a cause DB 121 indicated by e broken line in FIGS. 2 and 7) that stores the same content as that stored in the cause DB 221. The mobile terminal apparatus 1 calculates a frequency spectrum from a sound recorded by the recording unit 16 in the mobile terminal apparatus 1 (step S301) and then estimates a cause of an unusual noise included in the recorded sound on the basis of the frequency spectrum and the cause DB 121 stored in the memory 12 (step S401). In this case, estimation of the cause of the unusual noise included in the recorded sound and display of information representing the coping method therefor are performed by the mobile terminal apparatus 1 and thus the cloud system 8 is unnecessarily.

2-5. Fifth Modification Example

The controller 11 of the mobile terminal apparatus 1 may function as a receiving unit 117 that receives a user operation of selecting a frequency component of a sound after the intensities of individual frequency components of the sound have been displayed by the display 15. In this case, the estimating unit 118 implemented by the controller 11 of the mobile terminal apparatus 1 or the estimating unit 212 implemented by the controller 21 of the estimating apparatus 2 may estimate a cause of an unusual noise included in a sound recorded by the recording unit 16, on the basis of the operation received by the receiving unit 117, the intensities of the individual frequency components calculated from the recorded sound, and the content stored in the cause DB 121 or the cause DB 221.

Figure 13:
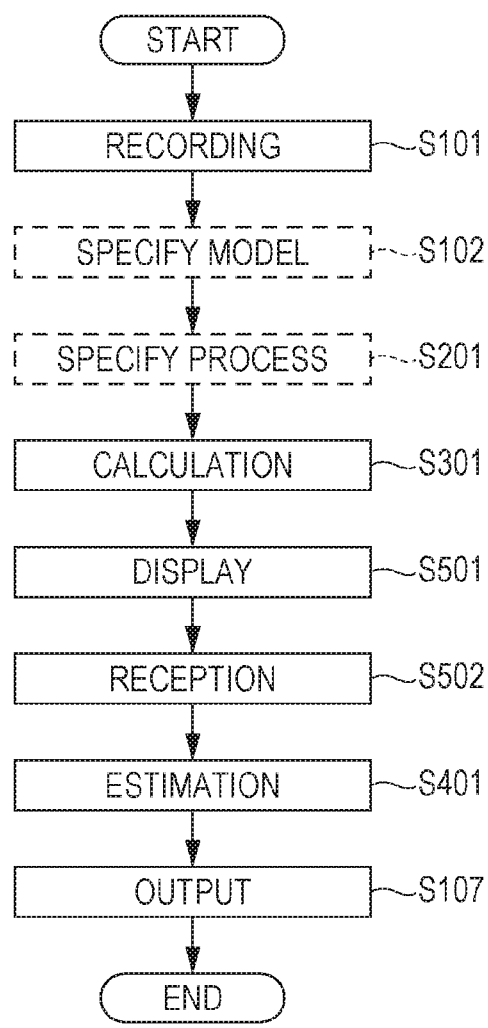
FIG. 13 is a flowchart illustrating a flow of operation of the mobile terminal apparatus according to a fifth modification example.

FIG. 13 is a flowchart illustrating a flow of operation of the mobile terminal apparatus 1 according to a fifth modification example. The mobile terminal apparatus 1 calculates a frequency spectrum from a sound recorded by the recording unit 16 in the mobile terminal apparatus 1 (step S301) and displays, on the display 15, the frequency spectrum, that is, the intensities of individual frequency components of the sound recorded by the recording unit 16 (step S501). After the frequency spectrum has been displayed on the display 15, if the user performs an operation of selecting a frequency component of the sound, the operation unit 14 of the mobile terminal apparatus 1 receives this operation (step S502).

Figure 14A:
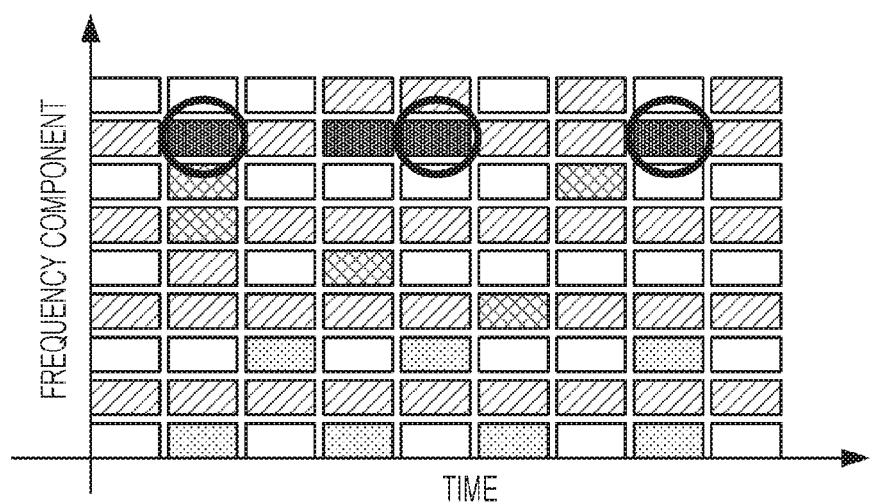
FIGS. 14A and 14B are diagrams illustrating examples of a frequency spectrum displayed on a display according to the fifth modification example.
Figure 14B:
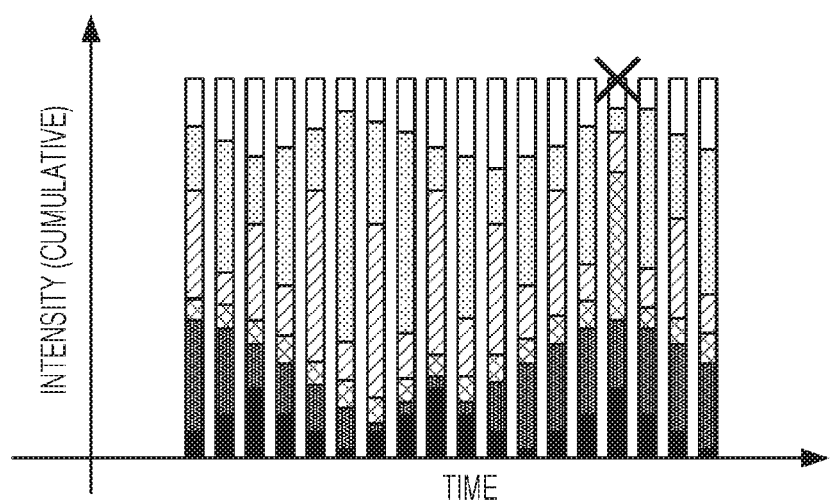

FIGS. 14A and 14B are diagrams illustrating examples of the frequency spectrum displayed on the display 15. In FIG. 14A, the horizontal axis represents time and the vertical axis represents frequency components. In this example, the display 15 displays temporal changes in the frequency spectrum calculated through STFT, and the intensity of a certain frequency component in a certain time section is expressed by a gradation value or color.

In FIG. 14B, the horizontal axis represents time and the vertical axis represents cumulative values of intensities. In this case, a frequency component is expressed by a gradation value or color.

The user who has looked at the frequency spectrum displayed on the display 15 operates the touch panel of the operation unit 14 and performs an operation of selecting a frequency component representing an unusual noise or an operation of selecting a frequency component representing a sound that is not an unusual noise.

In a case where an operation of selecting frequency components representing an unusual noise is received, for example, the display 15 may perform display in which the selected frequency components are circled, as illustrated in FIG. 14A, so as to indicate that the frequency components represent the unusual noise. In a case where an operation of selecting a frequency component representing a sound that is not an unusual noise is received, for example, the display 15 may perform display in which a cross mark is attached on the selected frequency component, as illustrated in FIG. 14B, so as to indicate that the frequency component does not represent an unusual noise. Alternatively, the color of a selected frequency component may be changed or blinked to indicate that the frequency component represents an unusual noise, so as to increase the visibility of the user.

The controller 11 of the mobile terminal apparatus 1 functions as the receiving unit 117 that receives such an operation, and narrows down the frequency components representing an unusual noise in the frequency spectrum on the basis of the received operation. The controller 11 estimates a cause of the unusual noise included in the recorded sound on the basis of the narrowed down frequency components and the cause DB 121 (step S401).

The position at which an indicator such as a finger of the user touches the touch panel may be different from the position intended by the user. The controller 11 of the mobile terminal apparatus 1 may modify the position, that is, may regard the position closest to the position indicated by the received operation among plural peaks that appear in the displayed frequency spectrum, as the position of the frequency component selected by the operation.

The receiving unit 117 may receive a user operation of selecting a frequency component again after the frequency component selected by the user has been displayed on the display 15.

2-6. Sixth Modification Example

The display 15 may display, instead of a frequency spectrum, a waveform of a sound signal in which the horizontal axis represents time and the vertical axis represents the amplitude of a sound. In this case, the user may select a position of the waveform indicating an unusual noise. When a user operates the touch panel to select plural points as a waveform indicating an unusual noise, the controller 11 of the mobile terminal apparatus 1 may measure the intervals between the plural points and may select again candidate frequency components representing the unusual noise by using the greatest common divisor of the intervals.

If the user selects plural points in the waveform of the sound signal, a candidate frequency component representing an unusual noise may be selected again on the basis of a peak of the waveform interposed between the plural points.

If the user selects one point in the waveform of the sound signal, fast Fourier transform may be performed on the sound signal corresponding to the time in a predetermined range including the selected point so as to calculate a frequency spectrum, and the peak of the frequency spectrum may be selected as a candidate frequency component representing an unusual noise. In this case, the range over which the fast Fourier transform is performed is limited, and thus the load of arithmetic processing for estimating a cause of the unusual noise may be reduced.

2-7. Seventh Modification Example

The information output system 9 may include, separately from the mobile terminal apparatus 1, an information processing apparatus 1a such as a personal computer operated by a specific operator. In this case, the information processing apparatus 1a may transmit information to and receive information from the cloud system 8 and the mobile terminal apparatus 1.

For example, the mobile terminal apparatus 1 transmits a sound signal representing a sound recorded by the recording unit 16 to the estimating apparatus 2. The information processing apparatus 1a includes an operation unit and a display that are the same as those of the mobile terminal apparatus 1, and also includes a reproducing unit that reproduces the sound signal as a sound.

The information processing apparatus 1a obtains the above-described sound signal from the estimating apparatus 2 and displays a waveform represented by the sound signal on the display. An operator visually checks the waveform of the sound signal displayed on the display, causes the reproducing unit to reproduce the sound signal, listen to the reproduced sound, and selects a portion of the waveform indicating a candidate unusual noise. When the selection operation performed by the operator is received by the information processing apparatus 1a, the information about the selection is transmitted to the estimating apparatus 2, which estimates a cause of the unusual noise included in the sound recorded by the recording unit 16 in accordance with the information about the selection.

2-8. Eighth Modification Example

A program executed by the controller 11 of the mobile terminal apparatus 1 may be provided by being stored in a computer readable recording medium, for example, a magnetic recording medium such as a magnetic tape or a magnetic disk, an optical recording medium such as an optical disc, a magneto-optical recording medium, or a semiconductor memory. The program may be downloaded via the Internet or the like. As the above-described controller 11, various devices may be applied instead of a CPU, for example, a dedicated processor may be used.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A mobile terminal apparatus portable by a user, comprising:
at least one hardware processor configured to implement:
a recording unit that records a sound that has been produced by another apparatus;
a memory that stores a cause of an unusual noise that occurs in the other apparatus and intensities of individual frequency components of the unusual noise in association with each other;
an estimating unit that estimates a cause of the sound that has been produced by the other apparatus, on the basis of a sum of exponentially squared differences between intensities of the individual frequency components of the sound recorded by the recording unit and reference intensities of the individual frequency components stored in the memory, the intensities being calculated from the sound; and an output unit that outputs information about the cause of the sound estimated by the estimating unit, wherein the estimating unit estimates the cause of the sound that has been produced by the other apparatus in response to a user selection of a portion of the individual frequency components, the portion being less than all of the individual frequency components of the sound.

2. The mobile terminal apparatus according to claim 1, wherein the at least one hardware processor further configured to implement:

a model specifying unit that specifies, from among a plurality of models, a model of the other apparatus that has produced the sound recorded by the recording unit, wherein the memory stores, for each of the plurality of models, a cause of an unusual noise and intensities of the individual frequency components of the unusual noise in association with each other, and wherein the estimating unit estimates the cause on the basis of the specified model, the intensities of the individual frequency components calculated from the sound, and content stored in the memory.

3. The mobile terminal apparatus according to claim 1, wherein the at least one hardware processor is further configured to implement:

a process specifying unit that specifies, from among a plurality of processes, a process that is being executed by the other apparatus when the sound recorded by the recording unit is produced, wherein the memory stores, for each of the plurality of processes, a cause of an unusual noise that occurs when the process is being executed and intensities of the individual frequency components of the unusual noise in association with each other, and wherein the estimating unit estimates the cause on the basis of the specified process, the intensities of the individual frequency components calculated from the sound, and content stored in the memory.

4. The mobile terminal apparatus according to claim 1, wherein the at least one hardware processor is further configured to implement:

a display that displays the intensities of the individual frequency components of the sound recorded by the recording unit; and a receiving unit that receives, after the intensities of the individual frequency components of the sound have been displayed by the display, an operation of selecting a frequency component of the sound performed by the user, wherein the estimating unit estimates the cause on the basis of the received operation, the intensities of the individual frequency components calculated from the sound, and content stored in the memory.

5. The mobile terminal apparatus according to claim 1, wherein the memory stores a cause of an unusual noise that occurs in the other apparatus and temporal changes in intensities of the individual frequency components of the unusual noise in association with each other, and wherein the estimating unit estimates the cause on the basis of temporal changes in the intensities of the individual frequency components calculated from the sound and content stored in the memory.

6. The mobile terminal apparatus according to claim 2, wherein at least one of the plurality of models is a model, other than the model of the other apparatus, and the estimating unit estimates the cause on the basis of a sum of exponentially squared differences between intensities of the individual frequency components of the sound recorded by the recording unit and reference intensities of the individual frequency components stored in the memory for the model other than the model of the other apparatus.

7. The mobile terminal apparatus according to claim 1, wherein the at least one hardware processor is further configured to implement:

a user interface that receives a user marking on a display of the sound, the user marking indicating the portion.

8. The mobile terminal apparatus according to claim 7, wherein the display of the sound is a display of the individual frequency components of the sound plotted as amplitude of the individual frequency components over the individual frequency components.

9. The mobile terminal apparatus according to claim 7, wherein the display of the sound is a display of the individual frequency components of the sound plotted as amplitude of the individual frequency components over the individual frequency components, the display of the sound being further plotted three-dimensionally over time.

10. The mobile terminal apparatus according to claim 7, wherein the display of the sound is a display of a waveform of the sound plotted as amplitudes of the sound over time.

11. A mobile terminal apparatus portable by a user, comprising:

a recording unit configured to record a sound that has been produced by another apparatus; and an output unit configured to output information about a cause of the sound, the cause being estimated, with reference to a database in which a cause of an unusual noise that occurs in the other apparatus and intensities of individual frequency components of the unusual noise are associated with each other in advance, on the basis of a sum of exponentially squared differences between the intensities of the individual frequency components of the sound recorded by the recording unit and reference intensities of the individual frequency components, the intensities being calculated from the sound; and an estimating unit configured to estimate the cause of the sound that has been produced by the other apparatus in response to a user selection of a portion of the individual frequency components, the portion being less than all of the individual frequency components of the sound.

12. A non-transitory computer readable medium storing a program causing a computer to execute a process for outputting information, the computer being included in a mobile terminal apparatus portable by a user and including a recording unit that records a sound that has been produced by another apparatus, the process comprising:

storing, in a memory, a cause of an unusual noise that occurs in the other apparatus and intensities of individual frequency components of the unusual noise in association with each other;

estimating a cause of the sound that has been produced by the other apparatus, on the basis of a sum of exponentially squared differences between the intensities of the individual frequency components of the sound and reference intensities of the individual frequency components stored in the memory, the intensities being calculated from the sound; and outputting information about the estimated cause of the sound, wherein estimating the cause of the sound that has been produced by the other apparatus is in response to a user selection of a portion of the individual frequency components, the portion being less than all of the individual frequency components of the sound.

* * * * *